United States Patent
Hayes et al.

[11] 3,919,702
[45] Nov. 11, 1975

[54] SMOKE DETECTOR

[75] Inventors: William H. Hayes, Ridgewood, N.J.; David P. McConnell, Hallsville, Mo.

[73] Assignee: Reliance Instrument Manufacturing Corporation, Lodi, N.J.

[22] Filed: Mar. 18, 1974

[21] Appl. No.: 452,313

[52] U.S. Cl. .............................. 340/237 S; 250/573
[51] Int. Cl.² ........................................ G08B 17/10
[58] Field of Search .............. 340/237 S; 356/207; 250/552, 564, 573

[56] References Cited
UNITED STATES PATENTS

| | | | |
|---|---|---|---|
| 1,296,613 | 3/1919 | Bell | 340/248 C |
| 2,741,099 | 4/1956 | Beane | 340/227.1 X |
| 3,513,311 | 5/1970 | McAlister et al. | 340/228 R X |
| 3,655,289 | 4/1972 | Walker | 356/207 X |
| 3,705,316 | 12/1972 | Burrous et al. | 250/552 X |
| 3,813,551 | 5/1974 | Broadbent et al. | 340/228 R X |

Primary Examiner—John W. Caldwell
Assistant Examiner—Daniel Myer
Attorney, Agent, or Firm—Caesar, Rivise Bernstein & Cohen

[57] ABSTRACT

A solid state smoke detector system comprising transmitting means including a lamp disposed on one side of a medium, whose opacity is to be monitored, for providing a constant intensity of light and receiving means including a photoelectric detector disposed on the other side of the medium for receiving light from the lamp. The transmitting means includes a voltage-controlled, constant-current source for providing a constant current to the lamp. Receiving means are provided and comprise a balanced, current-to-voltage converter coupled to an intermediate amplifier to provide a voltage signal which is a linear function of the light received by the photoelectric detector. The voltage signal is provided to a meter driver circuit for driving an indicating meter to thereby provide an indication of the opacity of the medium. The meter driver circuit includes a voltage-controlled, constant-current source. The voltage signal is also provided to a comparator circuit which provides an alarm signal when the voltage signal exceeds a predetermined level.

3 Claims, 5 Drawing Figures

SMOKE DETECTOR

This invention relates generally to transmissometers for measuring the transmittance of the light from a controlled source through a variable density medium and more particularly, it relates to solid-state devices for measuring the optical density of emissions, such as smoke, dust, or particulate matter, in the stacks of boilers, furnaces and the like.

Heretofore, various apparatus for monitoring the opacity of a variable density medium, such as, smoke, dust, etc., have been disclosed and some are commercially available. See, for example U.S. Pat. Nos. 3,376,425 (Kraus et al.), 3,447,037 (Tanzman), and 3,655,289 (Walker).

Such apparatus generally operate by providing a beam of light from a light emitting means, e.g. a lamp, through the medium, whose opacity is to be determined, to receiving means. The receiving means generally includes a photoelectric device and additional circuitry for providing a signal indicative of the light received by the detector. The signal is used to drive a meter or to provide warning signals to indicate the opacity of the medium.

While such apparatus are generally capable of measuring the opacity of variable density media, each of the prior art devices exhibits one or more drawbacks, such as sensitivity, reliability, size, complexity, etc.

Accordingly, it is the general object of this invention to provide apparatus for monitoring the opacity of a variable density medium and which overcomes various disadvantages of the prior art.

It is a further object of this invention to provide apparatus for monitoring the opacity of a variable density medium and for providing output signals indicating the measured condition as well as warning signals if the measured opacity exceeds a predetermined level.

It is still a further object of this invention to provide a device for monitoring the opacity of a variable density medium, which device is both sensitive and reliable.

It is still another object of this invention to provide a solid-state transmissometer.

These and other objects of this invention are achieved by providing a solid state system for monitoring the opacity of a variable density medium and for providing an output signal in response thereto, comprising a source of light adapted to be positioned on one side of said medium, means for regulating the current to said light source to ensure that the intensity and color temperature of the light produced by said source is a constant value, said means comprising a voltage-controlled, constantcurrent source including an operational amplifier having an output controlling the conduction of an electronic switch to regulate the magnitude of current provided to said light source, receiving means comprising photoelectric means disposed opposite said light source with said medium interposed therebetween to sense the level of light passing through said medium, said receiving means providing a signal indicative of the magnitude of the light received and indicator means responsive to said receiving means to provide said output signal.

Other objects in many of the attendant advantages of this invention will be readily appreciated as the same becomes better understood by reference to the following detailed description when considered in connection with the accompanying drawings wherein:

Figure 1:
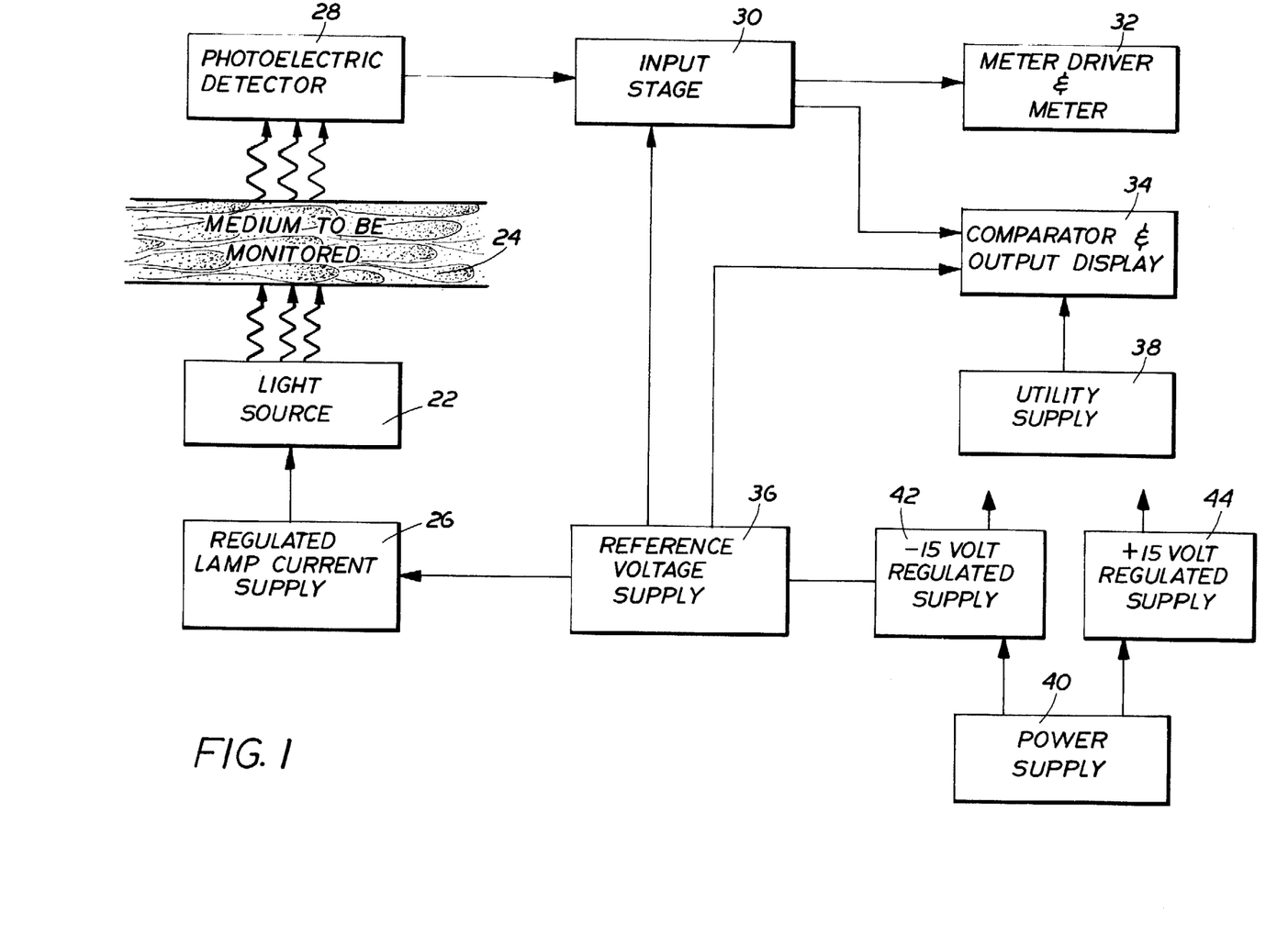
FIG. 1 is a functional block diagram of the transmissometer system in accordance with this invention.

Referring now to the various figures of the drawings wherein like reference numerals refer to like parts, there is shown in FIG. 1 an improved transmissometer 20.

The apparatus shown in FIG. 1 is adapted for measuring the optical density of variable density media, such as emissions in the stacks of boilers, furnaces and in the processes where other than clear gases are emitted.

The apparatus, basically, comprises light transmitting means disposed upon one side of the medium to be monitored and adapted to emit a light beam of a constant magnitude. Receiving means are disposed on the opposite side of the medium and in the path of the light beam from the light transmitting means. The amount of light received by the receiving means after it completes its path through the medium is measured by the receiving means and provided to indicator/alarm means which provide a proportional electrical signal. The signal is used to drive a meter to display the monitored condition of the medium in Ringlemann numbers and corresponding per cent opacity. A comparator and alarm means are also provided to provide an alarm signal in the event that the measuring opacity of the medium exceeds a predetermined level.

In FIG. 1 there is shown the entire transmissometer in functional block diagram form. As can be seen therein, system 20 basically comprises the light transmitting means, comprising a light source 22, which is disposed on one side of a variable density medium 24 which is to be monitored and a regulated lamp current supply 26 for providing a constant current to the light source 22. The receiving portion of the system comprises a photoelectric detector 28 which is disposed opposite to the light source and on the other side of medium 24. The photoelectric detector is connected to input stage circuitry 30. The input stage circuitry is adapted to provide a signal which is a linear function of the magnitude of the light received by the photoelectric detector in response to an electrical signal provided by the detector. The input stage circuitry 30 is connected to a meter driver and meter circuit 32 and a comparator and output display circuit 34.

The meter driver and meter circuit is adapted to provide an indication of the opacity of the medium 24 in response to signals provided by the input stage circuitry 30. The comparator and output display 34 is adapted to provide a warning signal in the event that the opacity of the medium 24 exceeds a predetermined value.

A reference voltage supply circuit 36 is included in the system to provide a highly stabilized, fixed reference voltage to the regulated lamp current supply 26, to the input stage circuitry 30 and to the comparator and output display circuit 34.

A utility supply circuit 38 is connected to the comparator and output display and serves as the power source for the display portion of the comparator and the output display circuit 34.

As can be seen, the apparatus 20 also comprises a main power supply circuit 40, a −15 volt regulated supply ciruict 42 and a +15 volt regulated supply circuit 44. The power supply 40 includes a pair of output lines, one of which serves as the input to supply 42 and the other of which serves as the input to supply 44. The regulated supply 42 provides −15 volt signals to various integrated circuits in the apparatus (as will be discussed later) and likewise the supply 44 provides +15 volt signals to these integrated circuit components.

The details of each of the aforementioned circuits will be described hereinafter.

Figure 2:
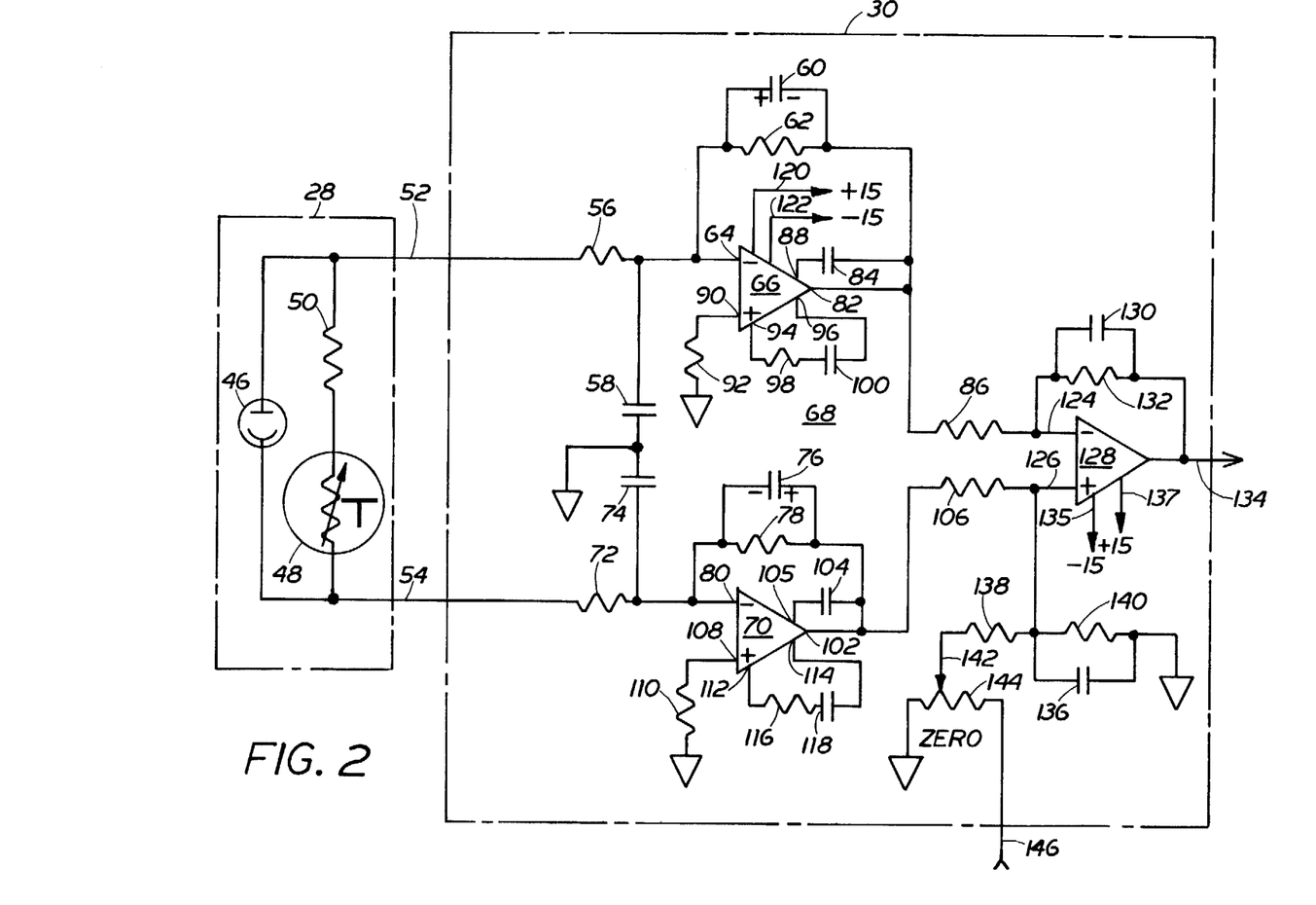
FIG. 2 is a schematic diagram of the circuitry of the photoelectric detector and the input stage shown in the functional block diagram of FIG. 1.

As can be seen in FIG. 2, the photoelectric detector 28 comprises a silicon photocell 46, a thermistor 48 and a resistor 50. As can be seen, the photocell 46 is connected in shunt with the series circuit formed by resistor 50 and thermistor 48. The common point of the resistor 50 and photocell 46 serves as one input to input stage 30 and the common point of the thermistor 48 and the other side of photocell 46 serves as the other input to the input stage 30.

Input line 52 is connected to one side of a resistor 56. The other side of resistor 56 is connected to a common point of a high frequency filter capacitor 58, a capacitor 60, a feedback resistor 62 and an inverting input terminal 64 of an operational amplifier 66. Operational amplifier 66 is one stage of a two stage differential amplifier 68. The other stage of differential amplifier 68 is provided by operational amplifier 70.

The other input line 54, of the input stage 30 is connected to one side of a resistor 72. The other side of the resistor 72 is connected to the common point of one side of a high frequency filter capacitor 74, one side of a capacitor 76, one side of a feedback resistor 78 and the inverting input terminal 80 of the operational amplifier 70. The other side of capacitor 74 is connected to ground and to the other side of capacitor 58.

The thermistor in conjunction with resistors 50, 56 and 72 serves to thermally stabilize the photocell 46.

As will be considered in detail later, each of the operational amplifiers 66 and 70 are connected to form current-to-voltage convertors, with each of the circuits providing a voltage which is a linear function of input current. To that end the input resistance to each of the amplifiers is extremely low. The two circuits 66 and 70 are preferably formed on the same substraight 50 as to form a balanced differential amplifier 68 having a very low input impedance. This is of considerable importance since typical silicon photocells produce a highly linear current with respect to light received when operating into a short circuit. Accordingly, the output of the amplifier 70 is a voltage which is directly proportional to input current and hence light received by the photocell.

The output of integrated circuit 70 is provided at terminal 102. Terminal 102 is connected to one side of a capacitor 104, one side of a resistor 106 and the common junction of resistor 78 and capacitor 76. The other side of capacitor 104 is connected to terminal 105 of the integrated circuit 70. The non-inverting input terminal 108 of circuit 70 is connected to one side of a resistor 110, the other side of which is connected to ground. Integrated circuit 70 also includes a pair of terminals 112 and 114 between which is connected the series combination of a resistor 116 and a capacitor 118.

Operating power is provided to the differential amplifier 68 via a pair of terminals 120 and 122 connected to amplifier 66. Terminal 120 is connected to the output terminal of the +15 volt regulated supply 44 and terminal 122 is connected to the −15 volt output terminal of the regulated supply 42.

Resistors 86 and 106 serve to provide the respective output voltages of amplifiers 66 and 68 to an intermediate amplifier having a pair of differential inputs 124 and 126. To that end, the other side of resistor 86 is connected to inverting input terminal 124 of amplifier 128 and the other side of resistor 126 is connected to non-inverting input terminal 126 of that amplifier. Ther inverting input terminal 124 is also connected to the common point of one side of a capacitor 130 and a feed-back resistor 132. The other side of capacitor 130 and resistor 132 are connected together to output terminal 134 of operational amplifier 128. Operating power is provided to intermediate amplifier 128 via a pair of terminals 135 and 137, with terminal 135 being connected to the output terminal of the −15 volt supply 42 and terminal 137 being connected to the output terminal of the +15 volt supply 44.

The positive input terminal 126 of amplifier 128 is connected to the common point of capacitor 136, resistor 138 and resistor 140. The other side of resistor 140 is connected to the other side of capacitor 136 and to ground. The other side of resistor 138 is connected to the wiper 142 of a potentiometer 144. One side of the potentiometer 144 is connected to ground and the other side is connected to input terminal 146. As will be considered in detail later, a negative fixed reference voltage is provided at input terminal 146.

Figure 3:
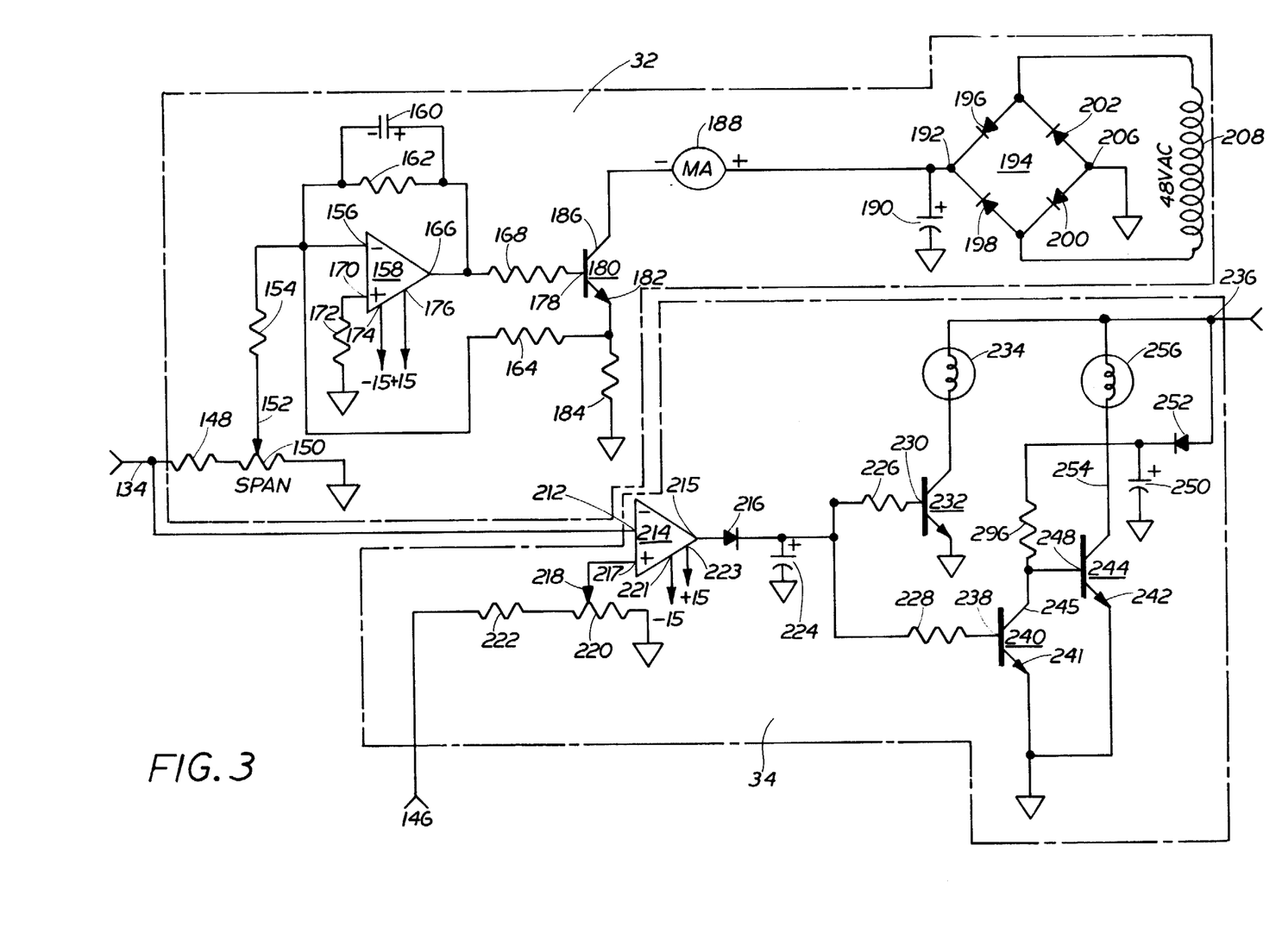
FIG. 3 is a schematic diagram of the circuitry of the meter driver and meter and the comparator shown in the functional block diagram of FIG. 1.

As can be seen in FIGS. 1 and 3, the output terminal 134 of the input stage 30 is provided as an input to meter driver and meter circuit 32 and also as an input to the comparator and output display circuit 34.

Capacitors 58 and 74 are provided to filter out any high frequency noise which may appear on input line 52 and 54 of the circuit 30. The resistors 62 and 78 serve to establish the gain of operational amplifiers 66 and 70, respectively. The capacitors 84 and 100 and the resistor 98 provide frequency compensation for amplifier 66. Similarly capacitors 104 and 118 and resistor 116 provide temperature compensation for amplifier 70. Capacitors 60 and 76 serve to attenuate high frequency signals which may appear at the inverting inputs of amplifiers 66 and 70, respectively.

The resistors 92 and 110 which serve as the non-inverting inputs to the amplifiers 66 and 70, respectively, serve to compensate for temperature induced output changes which result from input bias current drift of the operational amplifiers.

In order to compensate for any operational variance of the amplifiers forming circuit 68, each of the components connected to operational amplifier 66 is closely matched in value to a corresponding component associated with operational amplifier 70. Accordingly, the voltages appearing at resistors 86 and 106 are identical but are of opposite polarity.

The intermediate amplifier 128 is arranged to amplify the differential voltages applied via resistors 86 and 106 to provide a negative output voltage which is referenced to ground. The output voltage provided at terminal 134 and is a linear function of the current flowing through lines 52 and 54 and is hence indicative of the magnitude of light received by photocell 46.

Resistors 132, 86 and 106 establish the gain of amplifier 128 and capacitor 130 provides frequency compensation thereto.

An extremely stable negative voltage, denoted as $V_{ref}$ is provided via terminal 146 to one side of potentiometer 144. The potentiometer 144 serves as the means for effecting the adjustment or zeroing of the meter in the meter circuit 32. As should be appreciated, a portion of the voltage $V_{ref}$ is applied by the potentiometer 144 and resistor 138 to the non-inverting input terminal 126 of the integrated circuit 128. A portion of the voltage $V_{ref}$ which is applied to the circuit 128 serves two purposes, namely, it offsets any inherent imbalances in the input solid-state circuits or meter driver circuits, which imbalances could be caused by imperfect matching of components therein and which would cause off zero readings in the meter and it inserts a bias into the intermediate amplifier to provide increasing output voltage (negative) as light reception by the photocell drops off.

As can be seen in FIG. 3, the output terminal 134 of intermediate amplifier 128 serves as the input to the meter driver and meter circuit 32 and to the comparator and output display circuit 34. To that end terminal 134 is connected to one side of a resistor 148 in circuit 32. The other side of the resistor 148 is connected to one side of a potentiometer 150.

The function of the potentiometer 150 is to adjust the overall gain of the system. The value of resistor 148 is chosen to establish the range of the meter from zero to one Ringlemann, corresponding to 0 to 20 percent opacity, and to 0 to 5 Ringlemann, corresponding to 0 to 100 percent opacity.

The other side of potentiometer 150 is connected to ground. The wiper of the potentiometer 150 is denoted by the reference numeral 152 and is connected to one side of a resistor 154. The other side of a resistor 154 is connected to the common junction of the inverting input terminal 156 of an integrated circuit, operational amplifier 158, the common junction of a capacitor 160 and a feedback resistor 162 and one side of a resistor 164. The other side of capacitor 160 and resistor 162 are connected together and to the output terminal 166 of integrated circuit 158 and to one side of a resistor 168. The positive or non-inverting input terminal 170 of circuit 158 is connected to one side of a resistor 172, the other side of which being connected to ground. Operating power is provided to amplifier 158 via a pair of terminals 174 and 176, terminal 174 being connected to the output terminal of the −15 volt supply 42 and terminal 176 being connected to the output terminal of the +15 volt supply 44.

The other side of resistor 168 is connected to the base 178 of a transistor 180. The emitter of transistor 180, is denoted by reference numeral 182 and is connected to the common junction of the other side of feedback resistor 164 and one side of resistor 184. The other side of resistor 184 is connected to ground. The collector of transistor 180 is denoted by the reference numeral 186 and is connected to one side of a milliamp meter 188.

The heretofore described components of the meter driver and meter circuit 32 comprise the meter driver portion of said circuit. As should be appreciated by those skilled in the art, the integrated circuit 158 and components connected thereto form a voltage-controlled, constant-current source. To that end, the gain of amplifier 158 is established by resistors 154, 162 and 164. Capacitor 160 serves to attenuate high frequency signals. Resistor 172 serves a similar function to resistors 92 and 110.

The operational amplifier 158 operates in the following manner: the voltage produced across the resistor 184 is a function of the current flowing through transistor 180 and hence meter 188, and is fed back through resistor 164 to the common point of resistors 154 and 162. The feedback voltage is summed with that portion of the voltage provided by input stage circuit 30, via the wiper 152 of potentiometer 150. The summed voltage is provided at the inverting input terminal 156 of amplifier 158 and is amplified and inverted thereby to provide the positive output signal proportional to the difference of the input and feedback voltages. The output signal appearing at terminal 166 of amplifier 158 is fed through resistor 168 to the base 178 of transistor 180.

The values of the components are established such that if the current flowing through resistor 184 exceeds a predetermined value, whereupon the feedback voltage exceeds the input voltage, the current provided by operational amplifier 158 to the base of transistor 180 decreases, whereupon resistor 180 begins to turn off. This action reduces the current flowing through resistor 184 and concurrently reduces the feedback voltage fed to the input terminal 156 of the operational amplifier. The effect of this action is to regulate the current flow through the transistor for a given level of input voltage. As will be appreciated, the operational amplifier and associated components are also operative to increase the level of current through the transistor in response to an increase in input voltage.

Accordingly, it should be appreciated that the heretofore described portion of the meter driver and meter circuit 32 is operative for producing an input current which is directly proportional to the applied input voltage.

The current which passes through transistor 180 and resistor 184 is the current which drives meter 188 and is provided by the following circuitry. The other side of the milliamp meter 188 is connected to the common point of a capacitor 190 and a D.C. terminal 192 of a rectifying bridge 194. Bridge 194 is a conventional four diode bridge including diodes 196, 198, 200 and 202. As can be seen, the cathode of diodes 196 and 198 are connected together to terminal 192 of the bridge 194. Similarly the anodes of diodes 200 and 202 and are connected together to the other D. C. terminal of the bridge, which terminal is denoted by the reference numeral 206. Terminal 206 is connected to ground. The cathode of diode 202 is connected to the anode of diode 196 and to one side of a secondary winding 208 of a transformer 210 (see FIG. 5). Similarly the cathode of diode 200 is connected to the anode of diode 198 and to the other side of secondary 208.

The primary winding 211 of transformer 210 is arranged to be connected to a conventional 110 volt, 60 Hz power source. The alternating voltage appearing on secondary 208 is rectified by bridge 194 and filtered by capacitor 190 to provide the current which drives the meter, with the meter setting being controlled by the conduction of transistor 180 as heretofore described.

As can be seen in FIGS. 3, the output voltage appearing at terminal 134, which, as previously noted, is a negative voltage and is indicative of the amount of light received by the photocell 46, is provided as an input to the comparator and output display circuit 34. To that end, output terminal 134 of circuit 30 is connected to an inverting input terminal 212 of an integrated circuit, operational amplifier 214. The output 215 of operational amplifier 214 is connected to the anode of a diode 216. The positive terminal or non-inverting input terminal of the amplifier 214 is connected to a wiper 218 of a potentiometer 220. One side of the potentiometer 220 is connected to ground and the other side of potentiometer is connected to one side of the resistor 222. The other side of resistor 222 is connected to terminal 146. As noted heretofore, the stable reference voltage $V_{ref}$ is provided at terminal 146.

Operating power is provided to amplifier 214 via a pair of terminals 221 and 223, terminal 221 being connected to the output terminal of the −15 volt supply 42 and terminal 223 being connected to the output of the +15 volt supply 44.

Insofar as the comparator and output display circuit 34 is concerned, the reference voltage $V_{ref}$ is provided through the non-inverting input terminal of the amplifier to the potentiometer 220 to establish a reference voltage for the amplifier.

As will be appreciated by those skilled in the art, the integrated circuit 214 is arranged as an open-loop, operational amplifier, such that it has an extremely high gain. Therefore, when the voltage appearing at terminal 212, which as previously noted, is indicative of the amount of light received by the photoelectric detector, exceeds a certain portion of the reference voltage, $V_{ref}$, which portion is established by potentiometer 220, the voltage appearing at the output terminal of the amplifier is the positive voltage of the operational amplifier power supply, i.e. plus 15 volts. Similarly when the voltage appearing at terminal 212 is less than that portion of the reference voltage $V_{ref}$ applied by potentiometer 220 to the non-inverting input terminal of the operational amplifier, the output voltage thereof is the negative supply voltage of the operational amplifier, i.e. −15 volts.

The portion of the reference voltage provided by potentiometer 222 establishes the maximum medium opacity to be detected before a warning signal is provided. The output signal of the amplifier 214 is indicative of whether or not the measured opacity of the medium exceeds the predetermined level and is in the form of a voltage signal which is coupled through diode 216 to lamp illumination circuitry. Diode 216 isolates the large negative output of the comparator from associated transistors (to be described later).

The lamp illumination circuitry comprises a capacitor 224, one side of which is connected to the cathode of diode 216 and the common junction of resistors 226 and 228. The other side of capacitor 240 is connected to ground. The other side of resistor 226 is connected to the base 230 of a transistor 232. The emitter of transistor 232 is connected to ground. The collector of transistor 232 is connected to one side of a red lamp 234. The other side of lamp 234 is connected to line 236. Line 236 is the output of the utility supply circuit 38 (see FIG. 5) and serves to provide a positive voltage thereat, e.g. +13 volts.

The other side of resistor 228 is connected to the base 238 of a transistor 240. The emitter 241 of transistor 240 is connected to ground and the emitter of 242 of a transistor 244. The collector 245 of transistor 240 is connected to one side of a resistor 246 and to the base 248 of transistor 244. The other side of resistor 246 is connected to one side of a capacitor 250 and to the cathode of diode 252. The other side of capacitor 250 is connected to ground and the anode of diode 252 is connected to the line 236. The collector 254 of transistor 244 is connected to one side of a green lamp 256, the other side of which is connected to line 236.

The immediately heretofore described circuitry operates in the following manner: a positive voltage is provided at line 236 and to one side of red lamp 234 and one side of green lamp 256. When the voltage appearing at terminal 134 of input stage 30 is below the portion of the reference voltage which is provided by potentiometer 220 to the non-inverting input terminal 217 of amplifier 214, which condition is indicative of a situation wherein the opacity of a medium as detected by the photocell is below a predetermined warning level, the voltage appearing at output terminal 215 of the operational amplifier is the negative voltage of the operational amplifier power supply. Accordingly, diode 216 blocks the passage of the signal to the base of transistors 232 and 240. This action results in transistor 232 being non-conductive, whereupon the lamp 234 does not illuminate. In addition, transistor 240 is also non-conductive, whereupon the position voltage signal appearing on line 236 is coupled through diode 252 and resistor 246 and the base 248 of transistor 244. Capacitor 250 serves to filter this signal. The voltage appearing at the base of transistor 244 causes transistor 244 to turn on, whereupon current is enabled to flow from line 236 through the green lamp 256 and conducting transistor 244 to ground. Accordingly, the green lamp illuminates.

It should thus be appreciated that the green lamp is illuminated whenever the measured opacity of the medium being monitored is below a predetermined level, which level is established by the setting of potentiometer 220.

When the opacity of the medium exceeds the predetermined level the voltage appearing at the input terminal 212 to amplifier 214 causes the output of the amplifier to be the positive voltage of the operational amplifier power supply. This positive voltage appearing at terminal 215 is coupled, via diode 216, through resistor 226 to the base 230 of transistor 232 and also through resistor 228 to the base 238 of transistor 240. The capacitor 224 serves to filter the signal provided at the output 215 of amplifier 214. The positive signal appearing at the base of transistor 232 causes it to commence conduction, whereupon current is enabled to flow through line 236, red lamp 234 and conducting transistor 232 to ground. This action effects the illumination of the red warning lamp. At the same time the positive voltage appearing at the base 238 of transistor 240 causes transistor 240 to commence conduction thereby clamping the base-to-emitter junction of transistor 244. This action causes transistor 244 to turn off, whereupon current is interrupted through the green lamp 256 and the lamp extinguishes.

Accordingly, it can be seen that as soon as the apparatus 20 senses that the opacity of the measured medium exceeds a predetermined level, the green light goes out and the red warning comes on.

Figure 4:
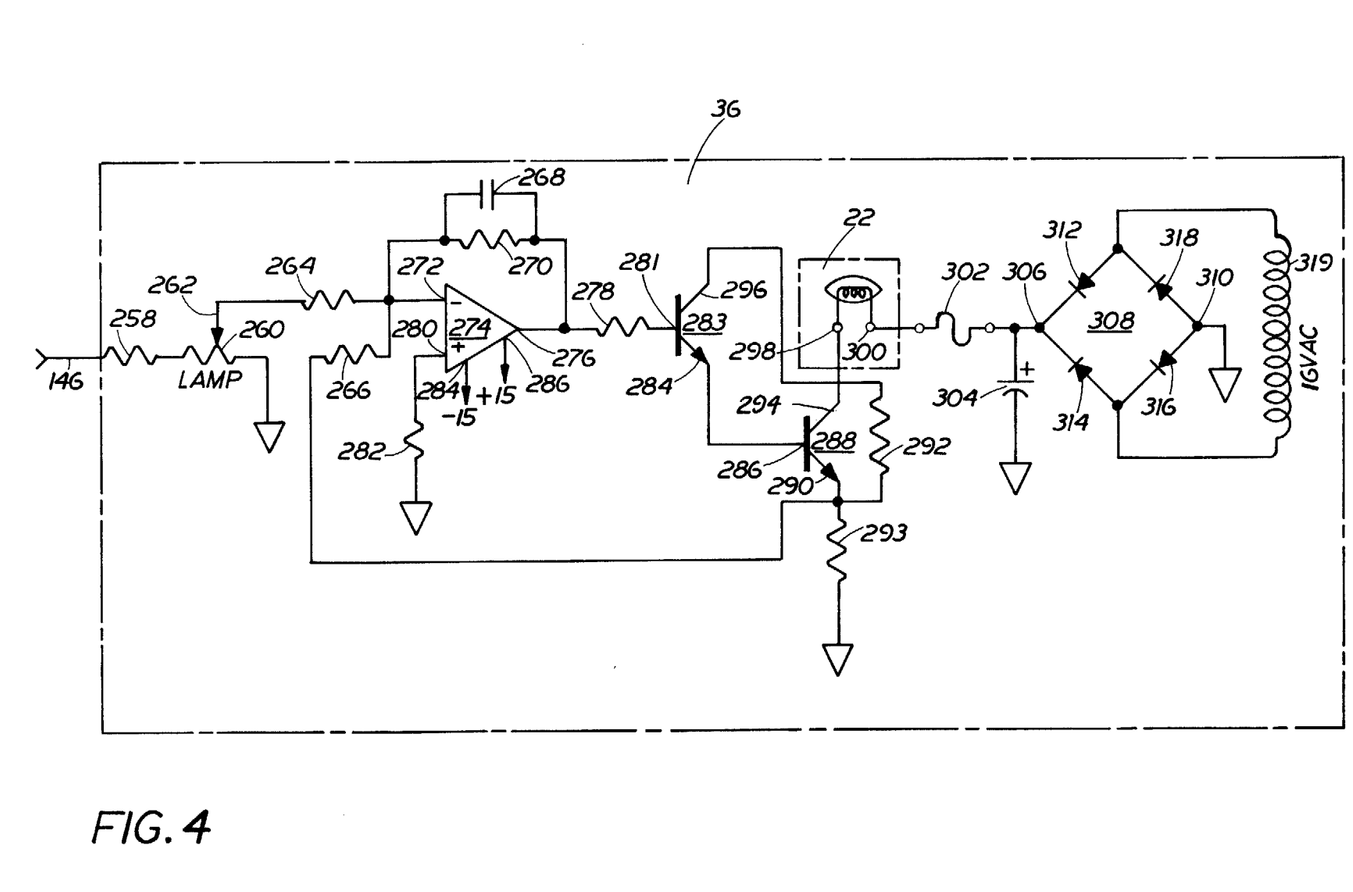
FIG. 4 is a schematic diagram of the circuitry of the regulated lamp current supply and the light source shown in functional block diagram of FIG. 1.

Turning now to FIG. 4, there is shown details of the regulated lamp current supply 26 and the associated light source 22. The current supply circuit 26 is arranged to provide a constant level of current to the light source, irrespective of voltage changes in the system. This feature is of extreme importance since any variation in the magnitude or color temperature of the light produced by the light source necessarily introduces inaccuracies into the system.

As can be seen in FIG. 4, terminal 146 forms the input of the regulated lamp current supply 26. As previously noted, the stable reference voltage $V_{ref}$ appears at terminal 146. Terminal 146 is connected to one side of the resistor 258. The other side of the resistor 258 is connected to one side of a potentiometer 260. The other side of potentiometer 260 is connected to ground. The wiper 262 of potentiometer 260 is connected to one side of a resistor 264, the other side of which is connected to one side of a resistor 266 the common junction of a capacitor 268 and a resistor 270 and to the inverting terminal 272 of an integrated circuit, operational amplifier 274. The output terminal 276 of the operational amplifier is connected to the common junction of the other side of capacitor 268 and the other side of a resistor 270 and to one side of a resistor 278. The positive or non-inverting input terminal 280 of amplifer 274 is connected to one side of resistor 282, the other side of which is connected to ground.

Operating power is provided to the amplifier 274 via a pair of terminals 284 and 286, with terminal 284 being connected to the output terminal of the $-15$ volt supply 42 and terminal 286 being connected to the output terminal of the $+15$ volt supply 44.

The other side of resistor 278 is connected to the base 281 of a transistor 283. The emitter 284 of the transistor 283 is connected to the base 286 of a transistor 288. The emitter of transistor 288 is denoted by the reference numeral 290 and is connected to the other side of resistor 266 and one side of a resistor 292 and to one side of a resistor 293. The other side of resistor 293 is connected to ground. The other side of resistor 292 is connected to the collector 294 of transistor 288, the collector 296 of transistor 283 and to one side 298 of the light source 22.

As can be seen, the light source comprises a conventional incandescent lamp. The other side of the lamp is denoted by the reference numeral 300 and is connected to one side of a fuse 302. The other side of fuse 302 is connected to one side of a capacitor 304 and to one D.C. terminal 306 of a rectifying bridge 308. The other side of capacitor 304 is connected to ground. The other D.C. terminal of bridge 308 is denoted by the reference numeral 310 and is connected to ground. The bridge 308 includes four diodes, 312, 314, 316 and 318. As can be seen, cathodes of diodes 312 and 314 are connected together at D.C. terminal 306 and the anodes of diodes 318 and 316 are connected at D.C. terminal 310 to ground. The cathode of diode 318 and the anode of diode 312 are connected together to one side of a secondary winding 319 of transformer 210. The cathode of diode 316 is connected to the anode of diode 314 and to the other side of secondary 319.

The operation of the amplifier 274 and associated components of the regulated current supply 36 is similar to that of amplifier 158 and associated components in the meter driver and meter circuit 32, except that the input voltage which is summed to the feed-back voltage at terminal 272 is a pre-established portion of the stabilized reference voltage $V_{ref}$. The portion of the voltage $V_{ref}$ which is provided from line 146 is determined by the setting of the wiper 262 of potentiometer 260. Accordingly, the setting of the wiper 262 of the potentiometer 269 establishes a fixed stabilized voltage which is compared to the feed-back voltage from resistor 293 to result in the production of a positive output voltage at terminal 276 of amplifier 274, which voltage is proportional to the feed-back voltage minus the fixed portion of the reference voltage $V_{ref}$. This voltage signal is used to control the illumination of the light source.

Since the light source 22 operates at a much higher current level than the output of the operational amplifier 274, the transistors 283 and 288 are arranged as a Darlington pair to effect the interface between the light source and the operational amplifier.

Operation of the regulated current supply circuit 26 is as follows: a portion of the reference voltage $V_{ref}$ is provided via resistor 258 and potentiometer 260 to the inverting input terminal 272 of amplifier 274 where it is summed with the feed-back voltage appearing across resistor 293. The operational amplifier 274 provides a positive output voltage which is proportional to the feed-back voltage minus the portion of the reference voltage provided by potentiometer 260. This signal is provided, via resistor 278, to the base 281 of transistor 283 to establish the level of conduction thereof and hence the amount of current provided to the base of transistor 288. This latter action establishes the level of conduction of transistor 288, whereupon direct current is provided from the secondary winding 319 of transformer 210 through bridge 308, fuse 302, light source 22, conducting transistor 288 and resistor 293 to ground. A substantial portion (e.g. 50 percent) of the current flowing through the light source takes a shunt path through resistor 292 and 293 to ground. As should be appreciated, the capacitor 304 effects the filtering of the D.C. signal provided by the bridge.

In order to ensure that the current through lamp 22 is regulated precisely, resistor 293 is a thermally stable, precision resistor.

Figure 5:
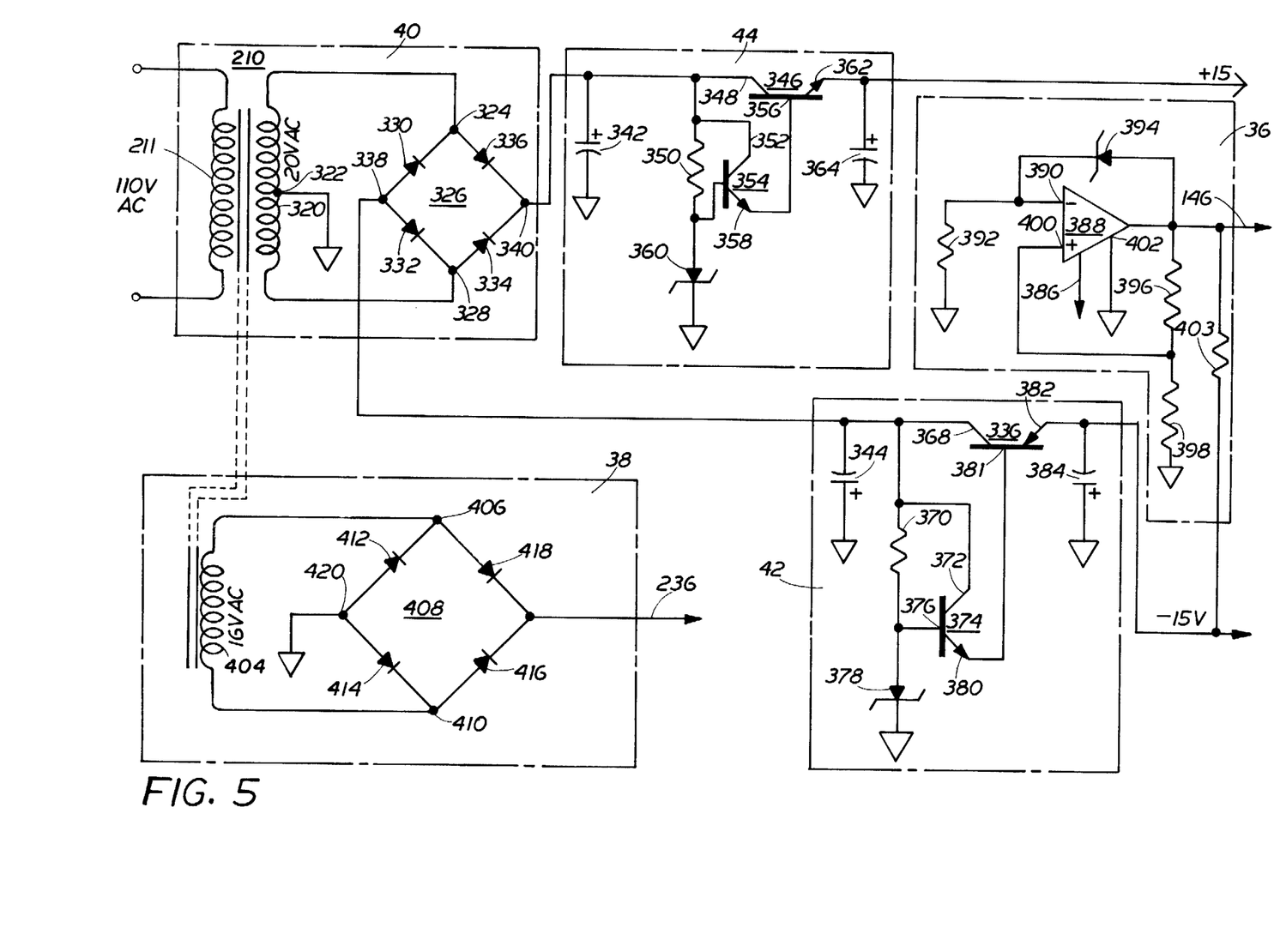
FIG. 5 is a schematic circuit diagram of the various power supplies shown in the functional block diagram of FIG. 1.

Turning now to FIG. 5 there is shown the details of the reference voltage supply circuit 36, the auxiliary supply circuit 38, the power supply circuit 40, the $-15$ volt regulated supply 42 and the $+15$ volt regulated supply 44.

As can be seen therein, the power supply 40 includes a transformer secondary winding 320 which is coupled to transformer primary 211 and which includes a center tap 322 which is grounded. As can be seen, one side of the secondary 320 is connected to A.C. terminal 324 of a rectifying bridge 326. The other side of secondary 320 is connected to the other A.C. terminal 328 of the bridge. The bridge includes four diodes 330, 332, 334 and 336. As can be seen, the cathode of diode 330 is connected to anode of diode 336 and to terminal 324, whereas the cathode of diode 332 is connected to the anode of diode 334 and to terminal 328. The anode of diode 330 is connected to the anode of diode 332 and to the negative D.C. terminal 338 of the bridge. Similarly, the cathode of diode 336 is connected to the cathode of diode 334 and to the positive D.C. terminal 340 of the bridge.

The $+15$ volt regulated supply includes a capacitor 342 connected between ground and terminal 340 of supply 40 to filter the positive D.C. voltage appearing at that terminal.

The $-15$ volt regulated supply also includes a capacitor 344 connected between the negative terminal 336 of supply 40 to filter the negative voltage appearing at that terminal.

As can be seen, the $+15$ volt regulator circuit 44 comprises a transistor 346 having a collector 348 connected to terminal 340 and to one side of a resistor 350 and to the collector 352 of a transistor 354. The base 356 of transistor 346 is connected to the emitter 358 of transistor 354. The base of transistor 354 is connected to the other side of resistor 350 and to the anode of zener diode 360. The cathode of zener diode 360 is connected to ground. The emitter of transistor 346 is denoted by reference numeral 362 and is connected to one side of a filter capacitor 364. The other side of the filter capacitor 364 is connected to ground.

As can thus be appreciated, the +15 volt regulated supply is of conventional type wherein the voltage appearing at the base of transistor 354 is stabilized by the zener diode 360, whereupon the level of conduction of transistor 354 is maintained at a predetermined level such that the level of conduction of transistor 346 is maintained at a constant level. Accordingly, a stabilized voltage of +15 volts appears at emitter 362. This voltage is filtered by capacitor 364 and serves as the +15 volt supply voltage to integrated circuits 68, 128, 158, 214 and 274. To that end, emitter 362 is connected to terminal 120 of integrated circuit 68, terminal 137 of integrated circuit 128, terminal 176 of integrated circuit 158, terminal 223 of integrated circuit 214 and terminal 286 of integrated circuit 274.

The −15 volt regulated supply is constructed in a similar manner to the +15 volt regulated supply 42 and is arranged to operate in a similar manner to provide −15 volts to integrated circuits 68, 128, 158, 214, 274 and to an integrated circuit in the reference voltage supply circuit, to be described later. To that end, the −15 volt regulated supply 42 includes a transistor 366, whose collector 368, is connected to the negative D.C. terminal 338 of power supply circuit 40, to one side of filter capacitor 344, to one side of resistor 370 and to the collector 372 of a transistor 374. The other side of resistor 370 is connected to the base 376 of transistor 374 and to the anode of zener diode 378. The cathode of the zener diode is connected to ground. The emitter of transistor 374 is denoted by the reference numeral 380 and is connected to the base 381 of transistor 366. The emitter of transistor 366 is denoted by the reference numeral 382 and is connected to one side of a filter capacitor 384, the other side of which is connected to ground. The emitter 382 of transistor 366 is connected to terminal 122 of integrated circuit 68, terminal 135 of integrated circuit 128, terminal 174 of integrated circuit 158, terminal 221 of integrated circuit 214, terminal 284 of integrated circuit 274, and a terminal, denoted by the reference numeral 386 in the reference voltage supply circuit 36. The capacitor 384 serves to filter the −15 volts appearing at the emitter 382.

The reference voltage supply circuit 36, as previously discussed, is arranged to provide a very stable negative voltage at terminal 146 and to the inputs of circuits 26, 30 and 34.

As can be seen in FIG. 5, the reference voltage supply circuit is of a conventional type and includes an integrated circuit, operational amplifier 388. The inverting input terminal 390 of the operational amplifier 388 is connected to one side of a resistor 392, the other side of which being connected to ground, and to the cathode of a temperature compensated zener diode 394. The anode of the zener diode is connected to terminal 146 which also serves as the output terminal of the amplifier 388. In addition, one side of a resistor 396 is connected to terminal 146. The other side of the resistor 396 is connected to one side of a resistor 398, the other side of which is connected to ground and to the non-inverting input terminal 400 of the operational amplifier 388. As previously noted, amplifier 388 includes the terminal 386 which is connected to the emitter 382 of transistor 366 in the −15 volt regulated supply. In addition, operational amplifier 388 also includes a terminal 402 which is connected to ground. A resistor 403 is connected between terminal 146 and the emitter of transistor 366 in circuit 42.

As will be appreciated to those skilled in the art, the voltage appearing on terminal 390 of amplifier 388 is equal to the output voltage of the amplifier, appearing on line 146 minus the zener voltage. The voltage appearing at terminal 390 is compared to the voltage appearing at non-inverting input terminal 400. This latter voltage is equal to the output voltage times the voltage divider ratio formed by resistors 396 and 398.

Since the amplifier 388 is operating as an open loop amplifier, the voltage of terminal 390 equals the voltage at terminal 400 and therefore the output voltage appearing at line 146 is established by the voltage divider ratio. The resistor 403 serves to provide initial current to start the amplifier.

In the interest of accuracy, the diode 394 is preferably a temperature compensated zener diode.

As can be seen, the utility supply 38 comprises a secondary winding 404 which is coupled to the primary winding 211 of transformer 210. One side of the secondary winding 404 is connected to an A.C. terminal 406 of a bridge rectifier circuit 408. The other side of the secondary winding 404 is connected to the other A.C. terminal 410 of the bridge. The bridge includes diodes 412, 414, 416 and 418. The cathode of diode 412 is connected to the anode of diode 418 at terminal 406 and the anode of diode 416 is connected to the cathode of diode 414 at terminal 410. The anode of diodes 412 and 414 are connected together at a D.C. terminal 420 which is connected to ground and the cathode of diodes 416 and 418 are connected together to form the positive D.C. terminal 236. As previously noted, terminal 236 serves as the input to the comparator and output display 34.

The following tables indicates the discription and/or value for the electrical components heretofore described and given reference numerals.

TABLE A

| Component | Value and/or Description |
|---|---|
| 46 | Solar Systems, Model SS-11 |
| 48 | Fenwal Electronics KB22J1 |
| 50 | 270 ohms |
| 56 | 4.8 ohms |
| 58 | 1 uf, 3 WVDC |
| 60 | 1 uf, 25 V |
| 62 | 10 K ohms |
| 72 | 4.7 ohms |
| 74 | 1 uf, 3 WVDC |
| 76 | 1 uf, 25 V |
| 78 | 10 K ohms |
| 84 | 200 pf, 1000 WVDC |
| 86 | 10 K ohms |
| 92 | 10 K ohms |
| 98 | 1.5 K ohms |
| 100 | .005 uf, 100 WVDC |
| 104 | 200 pf, 1000 WVDC |
| 106 | 10 K ohms |
| 110 | 10 K ohms |
| 116 | 1.5 K ohms |
| 118 | .005 uf, 100 WVDC |
| 130 | 1 uf |
| 136 | 1 uf |
| 138 | 10 K ohms |
| 140 | 10 K ohms |
| 144 | 10 K ohms |
| 148 | 1.5 K ohms |

TABLE A-continued

| Component | Value and/or Description |
|---|---|
| 150 | 10 K ohms |
| 154 | 10 K ohms |
| 160 | 1 uf, 25 V |
| 162 | 200 K ohms |
| 164 | 2.2 K ohms |
| 168 | 47 ohms |
| 172 | 10 K ohms |
| 180 | 2N6292 |
| 184 | 47 ohms |
| 190 | 100 uf, 50 V |
| 196 | 1N4004 |
| 198 | 1N4004 |
| 200 | 1N4004 |
| 202 | 1N4004 |
| 216 | 1N4004 |
| 220 | 10 K ohms |
| 222 | 2.2 K ohms |
| 224 | 33 uf, 10 V |
| 226 | 150 ohms |
| 228 | 1100 ohms |
| 232 | 2N5784 |
| 240 | 2N3565 |
| 244 | 2N5794 |
| 246 | 510 ohms |
| 250 | 50 uf, 25 V |
| 252 | 1N4004 |
| 258 | 2.2 K ohms |
| 260 | 10 K ohms |
| 264 | 10 K ohms |
| 266 | 2.2 K ohms |
| 268 | 1 uf, 25 V |
| 270 | 200 K ohms |
| 278 | 47 ohms |
| 282 | 10 K ohms |
| 283 | 2N3053 |
| 288 | Motorola MJE 3055 |
| 292 | 10 ohms, 20 W |
| 293 | 0.1 ohms, 3W, 1% |
| 304 | 1100 uf, 50 V |
| 308 | International Rectifier 60FB05L |
| 330 | 1N4004 |
| 332 | 1N4004 |
| 334 | 1N4004 |
| 336 | 1N4004 |
| 342 | 1100 uf, 50V |
| 344 | 1100 uf, 50V |
| 346 | 2N6290 |
| 350 | 1100 ohms |
| 354 | 2N3563 |
| 360 | 1N4743, 13V |
| 364 | 100 uf, 50V |
| 366 | 2N6109 |
| 370 | 1100 ohms |
| 374 | 2N4250 |
| 378 | 1N4743, 13V |
| 384 | 100 uf, 50V |
| 392 | 1 K ohms |
| 394 | 1N4575, 6.8V |
| 396 | 33 k ohm |
| 398 | 1 K ohm |
| 403 | 200 K ohm |
| 408 | International Rectifier 60FB05L |

TABLE B

| Integrated Circuit Component | | Description |
|---|---|---|
| 68 | | Motorola, Model MC1537L |
| | 64 | ditto, pin 9 |
| | 80 | ditto, pin 5 |
| | 82 | ditto, pin 12 |
| | 88 | ditto, pin 13 |
| | 90 | ditto, pin 8 |
| | 94 | ditto, pin 10 |
| | 96 | ditto, pin 11 |
| | 102 | ditto, pin 2 |
| | 105 | ditto, pin 1 |
| | 108 | ditto, pin 6 |
| | 112 | ditto, pin 4 |
| | 114 | ditto, pin 3 |
| | 120 | ditto, pin 14 |
| | 122 | ditto, pin 7 |
| 128 | | 741C |
| | 124 | ditto, pin 2 |
| | 126 | ditto, pin 3 |
| | 134 | ditto, pin 6 |
| | 135 | ditto, pin 4 |
| | 137 | ditto, pin 7 |

TABLE B-continued

| Integrated Circuit Component | | Description |
|---|---|---|
| 158 | | 741C |
| | 156 | ditto, pin 2 |
| | 166 | ditto, pin 6 |
| | 170 | ditto, pin 3 |
| | 174 | ditto, pin 4 |
| | 176 | ditto, pin 7 |
| 214 | | 714C |
| | 212 | ditto, pin 2 |
| | 215 | ditto, pin 6 |
| | 217 | ditto, pin 3 |
| | 221 | ditto, pin 4 |
| | 223 | ditto, pin 7 |
| 274 | | 741C |
| | 272 | ditto, pin 2 |
| | 276 | ditto, pin 6 |
| | 280 | ditto, pin 3 |
| | 284 | ditto, pin 4 |
| | 286 | ditto, pin 7 |
| 388 | | 741C |
| | 386 | ditto, pin 4 |
| | 390 | ditto, pin 2 |
| | 400 | ditto, pin 3 |
| | 402 | ditto, pin 7 |
| | 146 | ditto, pin 6 |

As should be appreciated from the foregoing, the transmissometer of this invention is a simple, yet reliable and economical system for monitoring the opacity of a variable density fluid. The system includes a constant intensity light source for providing a fixed and pre-established magnitude of light which is aimed through the medium to be monitored and which is adapted to be received by a silicon photocell. Circuitry is provided coupled to the cell to eliminate extraneous electrical noise, while providing a signal indicative of the intensity of the light received by the cell. The signal is arranged control the reading of a calibrated meter which indicates opacity from 0 to 100 percent (in Ringlemann numbers from 0 to 5). In addition, the same signal is utilized by the adjustable comparison circuit to trigger an alarm lamp if the measured opacity exceeds a predetermined level.

While the alarm circuitry described heretofore is shown including only indicator lamps, it is to be understood that various other functions, such as, time delays, audible alarms, etc. may be provided as desired.

Without further elaboration, the foregoing will so fully illustrate my invention that others may, by applying current or future knowledge, readily adapt the same for use under various conditions of service.

We claim:

1. A solid state system for monitoring the opacity of a variable density medium and for providing an output signal in response thereto comprising a source of light adapted to be positioned on one side of said medium, means for regulating the current to said source of light to ensure that the intensity and color temperature of light produced by said source is a constant value, said means comprising a voltage-controlled, constant-current source including an operational amplifier having an output controlling the conduction of an electronic switch to regulate the magnitude of current provided to said light source, said voltage controlled, constant-current source being provided with a stabilized reference voltage, receiving means comprising photoelectric means disposed opposite said light source, with said medium interposed therebetween, to sense the level of light passing through said medium, indicator means, a balanced current-to-voltage converter comprises a pair of integrated circuit operational amplifiers formed on a common substrate and having an extremely low input resistance to provide a first signal to said indicator means and which is a linear function of the magnitude of light received by said photoelectric means, and an intermediate amplifier having differential inputs, one of said inputs being provided by one of the operational amplifiers of the balanced current-to-voltage converter and the other input being provided by the other of the operation amplifiers of said converter, said intermediate amplifier providing said first signal, said indicator means comprising a meter and a voltage controlled constant current source responsive to said first signal from the balanced current-to-voltage converter for regulating the magnitude of current flowing through said meter, to provide an output signal.

2. The system of claim 1, wherein one of the differential inputs of said intermediate amplifier is coupled to said stabilized reference voltage.

3. The system of claim 1, wherein means are provided to adjust the magnitude of a portion of said stabilized reference voltage which is provided to an input of said intermediate amplifier to effect the zeroing of said meter.

* * * * *